(12) United States Patent
Li et al.

(10) Patent No.: US 6,569,392 B1
(45) Date of Patent: May 27, 2003

(54) THREE-WAY RARE EARTH OXIDE CATALYST

(75) Inventors: Shiyao Li, Dallen (CN); Jun (John) Li, Carlton, MI (US); Ronald G. Hurley, Farmington Hills, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 09/496,527

(22) Filed: Feb. 2, 2000

(51) Int. Cl.[7] ............... B01J 8/02; B01J 8/00; B01J 23/00; C01B 21/00
(52) U.S. Cl. ............... 423/213.5; 423/239.1; 423/247; 502/304; 502/349
(58) Field of Search ............... 502/304, 349; 423/213.2, 213.5, 239.1, 247

(56) References Cited

U.S. PATENT DOCUMENTS

| | | | | |
|---|---|---|---|---|
| 4,294,726 A | * | 10/1981 | Bozon et al. | 252/462 |
| 4,440,874 A | * | 4/1984 | Thompson | 502/327 |
| 4,504,598 A | * | 3/1985 | Ono et al. | 502/303 |
| 4,791,091 A | * | 12/1988 | Bricker et al. | 502/303 |
| 4,904,633 A | * | 2/1990 | Ohata et al. | 502/304 |
| 5,492,878 A | * | 2/1996 | Fujii et al. | 502/304 |
| 5,945,369 A | * | 8/1999 | Kimura et al. | 502/304 |
| 5,958,829 A | * | 9/1999 | Domesle et al. | 502/333 |
| 6,150,288 A | * | 11/2000 | Suzuki et al. | 501/105 |
| 6,150,299 A | * | 11/2000 | Umemoto et al. | 502/304 |

* cited by examiner

Primary Examiner—Wayne A. Langel
Assistant Examiner—Jonas N. Strickland
(74) Attorney, Agent, or Firm—Brooks & Kushman P.C.; Damian Parcari

(57) ABSTRACT

The invention is a method of manufacturing a three-way catalyst and the catalyst as well as its use for treating exhaust gas generated by a gasoline internal combustion engine. The catalyst composition comprises a mixture of particles of three different materials. More specifically, it includes a mixture of calcined ceria/zirconia particles impregnated with platinum together with palladium, other calcined ceria/zirconia particles impregnated with only rhodium precious metal, and alumina particles not impregnated with precious metal.

15 Claims, No Drawings

THREE-WAY RARE EARTH OXIDE CATALYST

FIELD OF THE INVENTION

The invention is directed to a method for manufacturing a cost-reduced, durable three-way catalyst useful to oxidize hydrocarbons, carbon monoxide and reduce nitrogen oxides in exhaust gas generated by a gasoline internal combustion engine operated near the stoichiometric A/F ratio. More particularly, the catalyst is made by a process which comprises mixing particles of three oxide materials, ceria-zirconia particles impregnated with platinum and palladium, ceria-zirconia particles impregnated with only rhodium as the precious metal, and a precious metal free gamma-alumina particle.

BACKGROUND OF THE INVENTION

Catalysts are employed in the exhaust systems of automotive vehicles to convert carbon monoxide, hydrocarbons, and nitrogen oxides (NOx) produced during engine operation into nonpolluting gases including carbon dioxide, moisture ($H_2O$), and nitrogen. When the gasoline powered engine is operated in a stoichiometric or slightly rich air/fuel ratio, i.e., between about 14.7 and 14.4, catalysts containing precious metals like platinum, palladium and rhodium are able to efficiently convert all three gases simultaneously. Hence, such catalysts are often called "three-way" catalysts. Typically such catalysts use a relatively high loading of precious metal to achieve the high conversion efficiency required to meet stringent emission standards of many countries. This makes the catalyst expensive. In countries where the emission standards are less stringent, a durable catalyst which would meet these less stringent standards and also be less expensive catalyst would be desirable.

We have now found a method for making a durable three-way catalyst which may use a significantly lower loading of precious metal than conventional catalysts making it less expensive, but which still obtains excellent exhaust gas conversion efficiency under close to stoichiometric conditions. This and other aspects of the invention will be discussed in detail below.

DISCLOSURE OF THE INVENTION

The invention is a method for manufacturing a durable, lower cost three-way catalyst useful for treating gasoline engine exhaust gases containing hydrocarbons, carbon monoxide, and nitrogen oxides (NOx). The catalyst has a relatively high loading of rare earth metals as compared to a low loading of precious metals which reduces its cost. The manufacturing method comprises mixing particles of three different materials together. One particle material is: (a) calcined ceria/zirconia particles, having a 20:1 to 1:1 Ce:Zr atomic ratio, impregnated with 1–20 wt. % two precious metal consisting essentially of platinum (Pt) with palladium (Pd) based on the weight of the impregnated particle, preferably this total precious metal loading is 3–8 wt. The second material is (b) calcined ceria/zirconia particle, having a 20:1 to 1:1 Ce:Zr atomic ratio, impregnated with 1–20 wt. % precious metal consisting essentially of only rhodium (Rh) based on the weight of the impregnated particle, preferably this precious metal loading is 3–8 wt. The third particle is: (c) gamma-alumina particles having a particle size, on average, of less than 5 µm. This alumina particle is not impregnated with precious metal.

These powder particles are combined in amounts so as to provide precious metal of Pt:Pd:Rh of about 3–10:3–10:1 by weight in the catalyst composition. The two particle materials impregnated with precious metal comprise 10–30 (wt) % of the catalyst material mixture, i.e., the mixture of the three kinds of particles. When this catalyst material is washcoated onto a substrate, such as a honeycomb substrate often termed a "catalyst brick", the catalyst material mixture preferably comprise about 10–20(wt) % of the total weight of the substrate plus the catalyst materials. Preferably, the total precious metal carried on the substrate is 9–17 $g/ft^3$ based on the volume of the substrate, e.g., the brick.

According to another aspect of the invention, it is the catalyst made by the process disclosed above and yet another aspect is the method of treating exhaust gases generated by a stoichiometric gasoline engine with the catalyst by contacting the gas with the catalyst.

PREFERRED EMBODIMENTS OF THE INVENTION

The present invention method for manufacturing a durable, low cost three-way catalyst which may be wash coated onto a substrate, such as the honeycomb substrates commonly used in catalytic converters in the automotive industry. The catalyst is a mixture of at least three particles, two of them being ceria-zirconia supports loaded with precious metal and a third not having been loaded with precious metal. This mixture of particles may be made into a slurry and then coated on the substrate. These particles and other aspects are discussed in detail below.

The ceria/zirconia particles may be made by any technique. One preferred technique involves impregnating ceria particles with a solution containing a soluble zirconium salt, water being the preferred liquid. Conveniently, water soluble zirconium compounds like nitrates and chlorides, or their mixtures, may be used. After the impregnation, the particles are dried and calcined in air for forming the ceria/zirconia particles. After drying, e.g., at 120° C. for several hours, they would be calcined in air at an elevated temperature, e.g., around 600° C. for several hours. The precise temperature and length of time of calcining are not critical. Some specific temperatures and times for certain embodiment of the invention are demonstrated in the examples below. It is believed that during calcining in the presence of air, the zirconium that is deposited on the ceria particle is converted to zirconium oxide in combination with oxygen from the air. Hence, this material is given herein as ceria/zirconia. It may be, however, that some is maintained as zirconium in the ceria particles. Either is considered acceptable and part of the present invention and is considered to be included within the terminology "ceria/zirconia" particles as used herein.

These particles are not expected to be a mere physical mixture ceria and zirconia, but rather are considered to bichemically bonded in the lattice through the oxygen atoms and hence they could be considered to be part of the same oxide. Another way to form these particles is by co-precipitation of the metal oxides, according to techniques well known to those skilled in the art in view of the present disclosure. It is believed that the close atomic proximity of the metal atoms within the oxide lattice of these particles, and optimally a relatively uniform dispersion of the oxides, contributes to the improved HC, CO, and NOx efficiency. Neither the truth nor the understanding of this theory is necessary for practice of the invention. It is provided in an attempt to explain the unexpected superior properties of the present invention catalyst.

As seen from the disclosure above, these ceria/zirconia precious metal support particles in their preferred embodiments contain an excess of cerium relative the zirconium. That is, while the Ce/Zr atomic ratio of these particle is in its broadest embodiment 20:1 to 1:1, preferably the ratio is 10:1 to 2:1. As disclosed above, ceria/zirconia particles "a" are used to support precious metal consisting essentially of platinum together with palladium, while ceria/zirconia particles "b" are used to support precious metal consisting essentially only of rhodium. Thus, the rhodium is carried as the sole precious metal on a different particle than carries the platinum/palladium mixture. The Ce/Zr atomic ratio may be the same or different for the particles "a" and "b" as is also the case for the amount of precious metal loading on these different particles.

To provide the precious metal on the ceria/zirconia particles, any technique including the well-known wet impregnation technique from soluble precious metal precursor compounds may be used. Water soluble compounds are preferred, including, but not limited to nitrate salts and materials for platinum like chloroplatinic acid. As is known in the art, after impregnating the washcoat with the precursor solution, it is dried and heated to decompose the precursor to its precious metal or precious metal oxide. As is known in the art, the precursor may initially decompose to the metal but be oxidized to its oxide in the presence of oxygen. While some examples of precious metal precursors have been mentioned above, they are not meant to be limiting. Still other precursor compounds would be apparent to those skilled in the art in view of the present disclosure. In addition to this incorporation from a liquid phase, the precious metal, such as the platinum, may be provided by sublimation of platinum chloride or other volatile platinum salts: by solid state exchange in the 300–500° C. temperature range using labile platinum compounds. There is no criticality to the type of precursor compound that may be used to provide the precious metal according to this invention. The platinum and/or palladium that are provided may be provided separately or as a mixture, as from a single solution mixture of the two, but in the latter case rhodium would not be included in the mixture. Rather, as discussed above, the rhodium is provided separately on the other ceria/zirconia particles as mentioned above. That is, the rhodium is impregnated on different particles than those carrying the platinum/palladium. This is critical to the present invention. Palladium has a relatively low sulfur tolerance, while rhodium has better reducing reactivity for NOx reduction. Thus the separation of rhodium from platinum/palladium helps to maintain the catalyst activity especially towards the NOx reduction even with relatively high sulfur content in the gasoline fuel. Neither the truth nor understanding of this theory is necessary however for practice of the present invention.

As disclosed above, the present invention method provides a durable catalyst which is able to efficiently convert exhaust gas components using a catalyst which may contain significantly less precious metal and at hence lower cost than conventional highly loaded three-way precious metal catalysts. This is believed to be the result of forming the catalyst from pre-made precious metal containing particles, rather than in the conventional way where a single powder is simply impregnated with all of the precious metals. In this latter conventional case, the precious metal would be dispersed evenly inside the washcoat and the reactive sites could be buried especially under the thermal attack experienced in actual exhaust system operation. In the present invention, the precious metals are provided onto pre-calcined particles which is believed to allow the reactive sites to remain readily available on the surface to be exposed to the exhaust gases. In addition, under thermal attack, more pores are generated due to the pre-calcined particle structure. Therefore, the exhaust can access the reactive sites more easily, resulting in a high conversion efficiency with the present invention catalyst even with a low precious metal loading. As explained above, neither the truth nor understanding is necessary to the practice of the present invention, however. It is provided in an attempt to explain the excellent properties of the present invention.

Besides the ceria/zirconia particles loaded with precious metal as described above, the invention catalyst particle mixture also includes particles of alumina on which no precious metal has been loaded. The alumina particles may be made from alumina like gamma-alumina as the sole alumina or mixed with other alumina forms, and may include stabilizers in small amounts for the alumina. It is well known in the art to stabilize alumina for high temperature use. Selection of such oxide stabilizers would be well known to those skilled in the art in view of the present disclosure. Examples of such oxide stabilizers include thermal stabilizers like titanium, zirconium or barium oxide, while structural stabilizers include for example, titanium and calcium oxide. The alumina is mixed with the stabilizers, e.g., as by milling in a slurry. The alumina particle size incorporated in the mixture of catalyst particles is optimally less than about 5 microns. In contrast, the ceria/zirconia particles incorporated in the mixture have a relatively larger particle size, that is 5 microns to about 100 microns, most optimally being 10–60 microns. When the particles are mixed and if the mixture is ball milled, the particle size may be reduced.

As disclosed above, in the catalyst particle mixture, three precious metals are present, platinum (Pt), palladium (Pd) and rhodium (Rh). The total platinum/palladium precious metal loading on particles "a" is broadly 1–20, preferably 3–8 wt. % based on the weight of these impregnated support particles, i.e., the weight of the particles with the impregnated precious metal. The rhodium loading on particles "b" is also broadly 1–20 wt. % based on the weight of these impregnated particles, with 3–8 wt. % being preferred. Another way to express this is: (Pt+Pd)/((Pt+Pd)+Ce/Zr)= 1–20%(wt), preferably 3–8%(wt) and Rh/(Rh+Ce/Zr)= 1–20%(wt), preferably 3–8%(wt).

These precious metal containing particle materials ("a" and "b") are mixed with alumina (particle "c") to form the catalyst composition. In the catalyst composition, the Pt:Pd:Rh weight ratio is 3–10:3–10:1. When this particle catalyst composition is washcoated on a substrate as would generally be the case for useful application, the precious metal-containing particles comprise 10–30 (wt) % of the washcoat materials, i.e,, ((Pt+Pd+Ce/Zr)+(Rh+Ce/Zr))/((Pt+Pd+Ce/Zr)+(Rh+Ce/Zr)+Y–Al$_2$O$_3$)=10–30%(wt). And when applied to a substrate, the washcoat material preferably comprises about 10–20 (wt) % of the entire catalyst substrate (brick). ((Pt+Pd+Ce/Zr)+(Rh+Ce/Zr)+gamma–Al2O3)/((Pt+Pd+Ce/Zr)+(Rh+Ce/Zr)+gamma–Al2O3+substrate)=10–20%(wt). The optimal total precious metal loading is about 9–17 g/ft$^3$ based on the volume of the substrate. That is, (Pt+Pd+Rh)/(volume of washcoated substrate)=9–17 g/ft$^3$.

In forming the catalyst, the particles are mixed together, optimally in a water slurry, and then applied to the substrate. For example, the alumina particle may be provided in a water slurry and then stabilizers like barium nitrate and magnesium mixed together in a nitric acid solution. This slurry can then be ball milled to form alumina particles of the desired size, generally less than 5 microns. The precious metal impregnated ceria/zirconia particles are then added in and ball milled to provide a uniform mixture of the particles in the slurry. The ball milling of the slurry can be continued to reduce the particle size of the particles, if desired. As the particle size of the washcoat particles decreases, the catalyst is more efficient in contacting the exhaust gas. The slurry is then diluted with water and adjusted to a viscosity suitable for coating on a substrate, at about 3000 cp.

As is known in the art, for useful application of the catalyst in an exhaust gas system, the catalyst is deposited or washcoated on a substrate (mechanical carrier) made of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

Techniques for providing an oxide washcoat on a substrate is well known to those skilled in the art. Generally a slurry of the mixed metal oxide particles and optionally stabilizer particles is coated on a substrate, e.g., as by dipping or spraying, after which the excess is generally blown off. Then it is heated to dry and calcine the coating, generally a temperature of about 700° C. for about 2–3 hours may be used. Calcining serves to develop the integrity of the ceramic structure of the washcoated oxide coating. The total amount of the precious metal/oxide washcoat carried on the substrate is about 10–20 wt. %, based on the weight of the substrate coated. Several coatings of the substrate in the washcoat may be necessary to develop the desired coating thickness/weight on the substrate. The substrate would optimally carry about 9–17 g/ft$^3$ of precious metal based on the volume of the substrate, more preferably being 10–15 g/ft$^3$.

The catalyst is expected to be used in automotive vehicles for emission treatment in the exhaust gas system where it functions to oxidize hydrocarbons, carbon monoxide, and simultaneously reduce nitrogen oxides to desired emission levels as for example in South American countries or in Asian countries. In these applications it is more than sufficient to meet the emission standards. In other situations where the catalyst would not be sufficient by itself to meet emission standards, for example as might be the case in the United States, the invention catalyst may be used in combination with another emission control catalyst. One such application involves the use of the invention catalyst downstream of another three-way catalyst either as a separate stage or as a separate brick in the same converter. Hence, the use of the present invention catalyst is not limited to a particular application.

EXAMPLE 1

(1) $Ce(NO_3)_3 \cdot 9H_2O$ was calcined at 200° C. for 1 hour, and then at 450° C. for 1 hour, to obtain $CeO_2$ particles with 5–20μ in diameter, and 90 m$^2$/g surface area.

40% $Zr(NO_3)_4 \cdot 5H_2O$ solution was used to impregnate the $CeO_2$ particles prepared above, which were dried at 60° C., and further at 120° C. for 2 hour, and then calcined at 600° C. for 4 hour, to obtain Zr-modified $CeO_2$ particles with an atomic ratio of Zr to Ce at 1:2 (particles A-1).

(2) 40% $Zr(NO_3)_4 \cdot 5H_2O$ solution was likewise used to impreganate $CeO_2$ particles as those prepared above, which are then dried at 60° C., and further at 120° C. for 2 hour, calcined at 600° C. for 4 hour, however, in this case to obtain Zr-modified $CeO_2$ particles with a different atomic ratio of Zr to Ce of 1:8 (particles B-1). Both A-1 and B-1 have diameters at 5–30μ.

$RhCl_3$ aqueous solution (containing 9% Rh (wt)) was used to impregnate particles A-1 which were then dried at 120° C. for 4 hours, calcined at 400° C. for 1 hour, and then at 600° C. for 3 hours, to obtain particles loaded with 7% (wt) Rh (particles C-1).

$H_2PtCl_6$ (containing 6% Pt (wt)) and $PdCl_2$ (containing 3% Pd (wt)) aqueous mixture was used to impregnate particles B-1, after which the particles were dried at 120° C. for 4 hours, calcined at 400° C. for 1 hour, and then at 600° C. for 3 hours, to obtain particles with a total Pt/Pd precious metal loading of 7% (wt) (particles D-1).

100 g $Al_2O_3 \cdot H_2O$, 130 g $Al(OH)_3$, 150 g g-$Al_2O_3$, 40 g $Al(NO_3)_3$, 60 g $Mg(CO_3)_2$, 40 g $Ba(NO_3)_2$, 1500 ml $H_2O$, 40 ml $HNO_3$ were mixed and ball-milled for 16–20 hr, to obtain $Al_2O_3$ slurry with average particle diameters less than 5μ (E-1).

To form the example 1 catalyst composition, 500 g E-1, 2.3 g C-1, 11.5 g D-1 were mixed and ball-milled together for 3 hours, diluting with deionized water, and adjust the viscosity of the mixture to about 3000 cp forming a catalyst according to an embodiment of the present invention. A 400 cpi honeycomb substrate is put in a coating can, vacuum-evacuate the can for 10 minutes, then add the mixture to coat the substrate. Gently blow away the excess slurry from the channels of the substrate, then dry at 120° C. for 2 hours, and then calcine at 500° C. for 1 hour, and then at 800° C. for 3 hours. Repeat the coating process to obtain a coated catalyst with precious metal loading at 14 g/ft$^3$. The catalyst is subjecting to a reducing atmosphere ($H_2/N_2$ mixture) at 600° C. for 3 hours for application.

EXAMPLE 2

This is another example of a catalyst made according to an embodiment of the present invention. Use $RhCl_3$ (5% Rh(wt)) to impreganate A-1, then dry at 1200° C. for 4 hours, calcining at 400° C. for 1 hour, and then at 600° C. for 3 hour, to obtain particles with 5% (wt) Rh (C-2).

Use 4% Pt (made from $H_2PtCl_6$) and 2% Pd (made fromPdCl$_2$) aqueous mixture to impregnate B-1, dry at 120° C. for 4 hours, calcine at 400° C. for 1 hour, and then at 600° C. for 3 hours, to obtain particles with 5% total (wt) of Pt and Pd (D-2)

Follow the same steps as described in Example 1 with the catalyst of this example to obtain a coated catalyst with precious metal loading at 10 g/ft$^3$.

EXAMPLE 3

This is another embodiment of the present invention. Use 9% Rh(wt) solution made from $RhCl_3$ to impregnate B-1, then dry at 120° C. for 4 hours, calcining at 400° C. for 1 hour, and then at 600° C. for 3 hours, to obtain particles with 7% (wt) Rh (C-3).

Use 6% Pt(wt) (made from $H_2PtCl_6$) and 3% Pd (wt) (made from $PdCl_2$) in an aqueous mixture to impregnate particles A-1, dry at 120° C. for 4 hours, calcining at 400°

C. for 1 hour, and then at 600° C. for 3 hours, to obtain particles with 7% total (wt) of Pt and Pd (D-3).

Follow the same steps as described in Example 1 except using the catalyst mixture made herein to obtain a coated catalyst with precious metal loading at 14 g/ft³.

EXAMPLE 4

This is a reference example not according to the present invention in that the particles supporting the precious metal do not contain zirconium. Following the steps described in Example 1, replace A-1 and B-1 (Zr-modified $CeO_2$ particles) with just $CeO_2$ particles, impregnate with Rh- and Pt/Pd-containing aqueous solution respectively as before, to obtain a catalyst with precious metal loading at 14 g/ft³.

EXAMPLE 5

This is another reference example not according to an embodiment of the present invention. Here all three precious metals are impregnated onto the same particles. Take 1 part of the Rh-containing solution and 5 part of the Pt/Pd-containing solution described in Example 1 to obtain a mixture, and then impregnate this mixture solution onto particles B-1, after drying and calcining as described in example 1, weigh 14 g of the particles thus prepared, and then mix with 500 g E-1, following the steps described in example 1, to obtain a coated catalyst with precious metal loading at 14 g/ft³.

EXAMPLE 6

This is yet another reference example not according to the present invention. In this example, the precious metal is applied together on a mixture of the particles. Weigh 500 g E-1, 2.3 g A-1, and 11.5 g B-1. After ball-milling, coat onto the honeycomb substrate, dry and calcine as described in example 1, impregnating with the same Pt/Pd-containing solution as in example 1, dry at 120° C., calcining at 600° C. After that, impregnate with the same Rh-containing solution as in example 1 on to the Pt/Pd coated substrate, drying, calcining as described in example 1. To obtain a catalyst with precious metal loading at 14 g/ft³.

Testing of the Catalysts

All the catalysts prepared as described in example 1–6 are oven-aged at 900° C. for 10 hours in air. The aged catalysts were evaluated in a flow reactor via. the laboratory redox sweep test described in SAE paper 760201 by Gandhi, et al. entitled "Laboratory Evaluation of Three-way Catalysts". In these redox sweep tests, the redox ratio $R=(P_{CO}+P_{H2}+9P_{C3H6}+10\ P_{C3H8})/(P_{NO}+2P_{O2})$ where R>1 represents an overall reducing gas mixture, R=1 a stoichiometric gas mixture, and R<1 an overall oxidizing gas mixture.

In the tests, the feedgas was a mixture of 1.2% CO, 1500 ppm $C_3H_6$, 1000 ppm NOx, 20 ppm $SO_2$, 10% $H_2O$, 0.6–1.4% $O_2$, with the balance being $N_2$. The reaction temperature was 400° C., space velocity was 55 000 hr⁻¹, Redox value R=1. The conversions are listed in the following Table I.

TABLE I

| Catalyst | Conversion (%) | | |
|---|---|---|---|
| | CO | HC | NOx |
| example 1 | 90.8 | 93.2 | 90.4 |
| example 2 | 88.8 | 90.4 | 89.5 |

TABLE I-continued

| Catalyst | Conversion (%) | | |
|---|---|---|---|
| | CO | HC | NOx |
| example 3 | 91.2 | 95.4 | 89.8 |
| example 4 | 76.5 | 78.4 | 68.3 |
| example 5 | 74.6 | 75.2 | 65.7 |
| example 6 | 65.4 | 68.3 | 45.8 |

It can be seen from these examples that the examples 1–3 of present invention embodiment catalysts provide significantly greater catalyst efficiency for converting exhaust gases than those of comparative examples 4–6 not according to the invention.

Vehicle test of the catalyst prepared as present invention embodiment example 1 was also conducted. The vehicle used was a 1.3 liter 1995 model Fiesta. The driving cycle used was MV-Euro. The result is shown as Table II. The catalyst was aged with 50 000 mile on a dynamometer

TABLE II

| | HC + NOx (g/km) | CO (g/km) |
|---|---|---|
| A proposed standard | 1.86 | 6.09 |
| Tailpipe exhaust with catalyst | 1.699 | 1.375 |

It can be seen that this embodiment catalyst appears to have the potential to meet these proposed standards for vehicle emissions.

We claim:

1. A method for manufacturing a three-way catalyst washcoat, useful for depositing on a substrate, for treating gasoline engine exhaust gases operated near stoichiometric A/F ratios and containing hydrocarbons, carbon monoxide, and nitrogen oxides (NOx), the method steps comprising mixing together particles of:

(a) ceria/zirconia calcined particles, having a 20:1 to 1:1 Ce:Zr atomic ratio, impregnated with 1–20 wt. % precious metal consisting essentially of platinum (Pt) and palladium (Pd) based on the weight of the impregnated particles;

b) ceria/zirconia calcined particles, having a 20:1 to 1:1 Ce:Zr atomic ratio, impregnated with 1–20 wt. % precious metal consisting essentially of rhodium (Rh) based on the weight of the impregnated particles, wherein the ceria/zirconia calcined particles are, on average, greater than 5 microns; and c) gamma-alumina particles having a particle size, on average, of less than 5µ;

the three particles being combined in the catalyst composition in amounts so as to provide precious metal of Pt:Pd:Rh of about 3–10:3–10:1, respectively, by weight, wherein said precious metal-containing particles are about 10–30 wt % of the catalyst composition.

2. The method according to claim 1 wherein the ceria/zirconia particles is made by impregnating ceria particles with a solution of a soluble zirconium salt and then drying and calcining the impregnated particles.

3. The method according to claim 1 wherein said precious metals are impregnated onto said ceria/zirconia particles from a solution of soluble salts of the precious metals.

4. The method according to claim 1 wherein at least one of the ceria/zirconia particles selected from the group consisting of said (a) and (b) has a Ce:Zr atomic ratio of 10:1 to 2:1.

5. The method according to claim 1 wherein the precious metal loading on at least one of (a) and (b) is 3–8 wt. %.

6. The method according to claim 1 wherein said catalyst is deposited on a substrate of honeycomb configuration in an amount which provides 10–20 wt. % catalyst on said substrate.

7. The method according to claim 6 wherein said total precious metal is 9–17 g/ft$^3$ based on the volume of the substrate.

8. The method according to claim 1 comprising mixing said alumina particles with water to form a slurry and admixing in the remaining components to provide a catalyst which is washcoated on a substrate.

9. The method according to claim 8 wherein the catalyst washcoat is deposited on a substrate and subjected to drying and calcination at elevated temperatures.

10. The method according to claim 9 wherein said calcined coating is subjected to a reducing atmosphere comprising at least nitrogen to reduce said precious metals.

11. The method according to claim 10 wherein said reducing atmosphere further includes hydrogen.

12. The method according to claim 1 wherein the catalyst further includes stabilizer for the alumina being one or more materials selected from the group consisting of calcium oxide, barium oxide, magnesium oxide, titanium oxide, and zirconium oxide.

13. A catalyst made according to the method of claim 1.

14. A method for treating exhaust gas generated by a gasoline internal combustion engine which gases comprise hydrocarbons, carbon monoxide and nitrogen oxides, which method comprises the steps of:

locating a three-way catalyst in the exhaust gas passage of a gasoline internal combustion operated near stoichiometric A/F ratios, said catalyst comprising a particle mixture of:
  (a) ceria/zirconia calcined particles, having a 20:1 to 1:1 Ce:Zr atomic ratio, impregnated with 1–20 wt. % precious metal consisting essentially of platinum (Pt) and palladium (Pd) based on the weight of the impregnated particles;
  b) ceria/zirconia calcined particles, having a 20:1 to 1:1 Ce:Zr atomic ratio, impregnated with 1–20 wt. % precious metal consisting essentially of rhodium (Rh) based on the weight of the impregnated particles, wherein the ceria/zirconia calcined particles are, on average, greater than 5 microns; and
  c) gamma-alumina particles having a particle size, on average, of less than 5$\mu$;
    the three particles being combined in the composition in amounts so as to provide Pt:Pd:Rh precious metal of 3–10:3–10:1, respectively, by weight, wherein the composition comprises total precious metal-containing particles in an amount of about 10 to 30 wt. %; and
  contacting said catalyst with said exhaust gases.

15. The method according to claim 14 wherein 0–8 wt % stabilizer for the alumina is included in the catalyst and is one or more material selected from the group consisting of calcium oxide, barium oxide, titanium oxide, and zirconium oxide.

* * * * *